(12) United States Patent
Busch et al.

(10) Patent No.: US 11,270,198 B2
(45) Date of Patent: Mar. 8, 2022

(54) MICROCONTROLLER INTERFACE FOR AUDIO SIGNAL PROCESSING

(71) Applicant: Syntiant, Aliso Viejo, CA (US)

(72) Inventors: Kurt F. Busch, Laguna Hills, CA (US);
Jeremiah H. Holleman, III, Irvine, CA (US); Pieter Vorenkamp, Laguna Beach, CA (US); Stephen W. Bailey, Irvine, CA (US)

(73) Assignee: Syntiant, Aliso Viejo, CA (US)

( * ) Notice: Subject to any disclaimer, the term of this patent is extended or adjusted under 35 U.S.C. 154(b) by 866 days.

(21) Appl. No.: 16/048,235

(22) Filed: Jul. 28, 2018

(65) Prior Publication Data

US 2019/0034791 A1  Jan. 31, 2019

Related U.S. Application Data (60) Provisional application No. 62/539,194, filed on Jul. 31, 2017.

(51) Int. Cl.
*G06N 3/04* (2006.01)
*G06N 3/08* (2006.01)
(Continued)

(52) U.S. Cl.
CPC ............. *G06N 3/0635* (2013.01); *G06F 3/16* (2013.01); *G06N 3/04* (2013.01); *G06N 3/08* (2013.01);
(Continued)

(58) Field of Classification Search
CPC ........ G06N 3/04; G06N 3/0635; G06F 3/162; H04R 25/507
See application file for complete search history.

(56) References Cited

U.S. PATENT DOCUMENTS

| 5,150,450 A | 9/1992 | Swenson et al. |
| 5,235,673 A | 8/1993 | Austvold et al. |

(Continued)

FOREIGN PATENT DOCUMENTS

CA  2501989 A1 * 9/2005 ......... G10L 21/0208

OTHER PUBLICATIONS

Chen, Yu-Jui, et al. "Neuromorphic pitch based noise reduction for monosyllable hearing aid system application." IEEE Transactions on Circuits and Systems I: Regular Papers 61.2 (2014): 463-475. (Year: 2014).*

(Continued)

*Primary Examiner* — Hal Schnee
(74) *Attorney, Agent, or Firm* — Ravi Mohan; Rutan & Tucker, LLP (57) ABSTRACT

Disclosed is a neuromorphic-processing systems including, in some embodiments, a special-purpose host processor operable as a stand-alone host processor; a neuromorphic co-processor including an artificial neural network; and a communications interface between the host processor and the co-processor configured to transmit information therebetween. The co-processor is configured to enhance special-purpose processing of the host processor with the artificial neural network. Also disclosed is a method of a neuromorphic-processing system having the special-purpose host processor and the neuromorphic co-processor including, in some embodiments, enhancing the special-purpose processing of the host processor with the artificial neural network of the co-processor. In some embodiments, the host processor is a hearing-aid processor.

17 Claims, 6 Drawing Sheets

(51) Int. Cl.
*H04R 25/00* (2006.01)
*G06N 3/063* (2006.01)
*G06F 3/16* (2006.01)
*G06N 3/10* (2006.01)

(52) U.S. Cl.
CPC ........... *G06N 3/105* (2013.01); *H04R 25/507* (2013.01); *G06F 3/162* (2013.01); *H04R 25/505* (2013.01)

(56) References Cited

U.S. PATENT DOCUMENTS

| | | | |
|---|---|---|---|
| 5,583,964 A * | 12/1996 | Wang | G06F 9/3879 706/41 |
| 5,754,661 A | 5/1998 | Weinfurtner | |
| 7,437,339 B2 | 10/2008 | Matsugu | |
| 8,401,297 B1 | 3/2013 | Apostolos et al. | |
| 8,793,205 B1 | 7/2014 | Fisher et al. | |
| 2005/0069162 A1 | 3/2005 | Haykin et al. | |
| 2011/0170560 A1 * | 7/2011 | Kyles | H03M 9/00 370/465 |
| 2013/0073495 A1 | 3/2013 | Izhikevich et al. | |
| 2013/0337786 A1 * | 12/2013 | Park | H04R 25/70 455/414.1 |
| 2015/0106085 A1 | 4/2015 | Lindahl | |
| 2015/0162002 A1 | 6/2015 | Liu et al. | |
| 2016/0173151 A1 * | 6/2016 | Kogawa | H04B 17/345 370/350 |
| 2016/0179434 A1 * | 6/2016 | Herrero Abellanas | G06T 1/60 711/155 |
| 2016/0192084 A1 * | 6/2016 | Oliaei | H04R 3/06 367/135 |
| 2016/0260008 A1 | 9/2016 | Arthur et al. | |
| 2016/0302014 A1 | 10/2016 | Fitz et al. | |
| 2016/0309267 A1 | 10/2016 | Fitz et al. | |
| 2017/0185888 A1 | 6/2017 | Chen et al. | |
| 2017/0229117 A1 | 8/2017 | van der Made et al. | |
| 2017/0286827 A1 | 10/2017 | Chen et al. | |
| 2017/0286829 A1 | 10/2017 | Chen et al. | |
| 2017/0344885 A1 | 11/2017 | Hosokawa et al. | |
| 2018/0122368 A1 | 5/2018 | Costello et al. | |
| 2018/0174026 A1 | 6/2018 | Davies | |
| 2018/0307912 A1 * | 10/2018 | Selinger | G06K 9/78 |
| 2018/0349508 A1 | 12/2018 | Bequet et al. | |
| 2019/0034791 A1 | 1/2019 | Busch et al. | |
| 2019/0042920 A1 | 2/2019 | Akin et al. | |
| 2019/0138892 A1 | 5/2019 | Kim et al. | |
| 2019/0206391 A1 | 7/2019 | Busch et al. | |

OTHER PUBLICATIONS

PCT Search Report, PCT/US18/44430, dated Oct. 17, 2018.
Extended European Search Report, EP Application No. 18841639.0 (PCT/US2018/0444430), dated Apr. 12, 2021.

* cited by examiner

MICROCONTROLLER INTERFACE FOR AUDIO SIGNAL PROCESSING

PRIORITY

This application claims the benefit of priority to U.S. Provisional Patent Application No. 62/539,194, filed Jul. 31, 2017, titled "Microcontroller Interface for Audio Signal Processing," which is hereby incorporated by reference into this application in its entirety.

FIELD

Embodiments of the disclosure relate to the field of neuromorphic computing. More specifically, embodiments of the disclosure relate to, but are not limited to, a microcontroller interface for audio signal processing and methods thereof.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence ("AI") algorithms. To accomplish this, neuromorphic chips may contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

There is an ongoing need for the development and enhancement of special-purpose processing capabilities such as that found in, for example, hearing aids. Provided herein are systems and methods for enhancing special-purpose processing capabilities for special-purpose processors operable as stand-alone processors utilizing a microcontroller interface.

SUMMARY

Disclosed herein is a neuromorphic-processing system including, in some embodiments, a special-purpose host processor operable as a stand-alone host processor; a neuromorphic co-processor including an artificial neural network; and a communications interface between the host processor and the co-processor configured to transmit information therebetween. The co-processor is configured to enhance special-purpose processing of the host processor with the artificial neural network.

In some embodiments, the host processor is a hearing-aid processor configured to transmit frequency elements or signal spectrum information to the co-processor in the form of Fourier transforms over a serial communications interface as the communications interface. The co-processor further includes a demultiplexer configured to demultiplex serial signals from the serial communications interface into parallel signals for a plurality of inputs of the artificial neural network.

In some embodiments, the communications interface between the host processor and the co-processor is a serial peripheral interface ("SPI") bus or inter-integrated circuit ("I$^2$C") bus.

In some embodiments, the co-processor is configured to enhance the special-purpose processing of the hearing-aid processor by providing information to the hearing-aid processor over the communications interface, thereby enabling the hearing-aid processor to selectively suppress noise and enhance desired signals.

In some embodiments, the co-processor is configured to enhance the special-purpose processing of the hearing-aid processor by providing a frequency mask to the hearing-aid processor over the communications interface, thereby indicating noise frequencies to suppress and signal frequencies to boost.

In some embodiments, the frequency mask is a set of attenuation or amplification factors corresponding to a set of frequencies to be suppressed or boosted for each of a number of time steps in an audio sample.

In some embodiments, the artificial neural network is disposed in an analog multiplier array of a plurality of two-quadrant multipliers in a memory sector of the multi-chip neuromorphic-processing system.

In some embodiments, synaptic weights of the artificial neural network are stored in firmware of the neuromorphic co-processor. The firmware is configured for cloud-based updates to update the synaptic weights of the artificial neural network.

In some embodiments, the host processor and the co-processor are embodied in a single monolithic integrated circuit, a stacked die assembly, a multi-chip module, or separate integrated circuits of separate modules. The neuromorphic-processing system is configured to operate on battery power.

Also disclosed herein is a neuromorphic processor including, in some embodiments, a plurality of interface circuits including a demultiplexer configured to demultiplex serial signals into parallel signals; and a multi-layered artificial neural network configured to receive the parallel signals from the interface circuits. The serial signals are received by the interface circuits from a serial communications interface between the neuromorphic processor and a special-purpose host processor. The neuromorphic processor is configured to enhance special-purpose processing of the host processor with the artificial neural network.

In some embodiments, the host processor is a hearing-aid processor. The neuromorphic processor is configured to receive frequency elements or signal spectrum information from the hearing-aid processor in the form of Fourier transforms over the serial communications interface.

In some embodiments, the neuromorphic processor is configured to enhance the special-purpose processing of the hearing-aid processor by providing information to the hearing-aid processor over the serial communications interface, thereby enabling the hearing-aid processor to selectively suppress noise and enhance desired signals.

In some embodiments, the neuromorphic processor is configured to enhance the special-purpose processing of the hearing-aid processor by providing a frequency mask to the hearing-aid processor over the serial communications interface, thereby indicating noise frequencies to suppress and signal frequencies to boost.

In some embodiments, the frequency mask is a set of attenuation or amplification factors corresponding to a set of frequencies to be suppressed or boosted for each of a number of time steps of an audio sample.

In some embodiments, the artificial neural network is disposed in an analog multiplier array of a plurality of two-quadrant multipliers in a memory sector of the neuromorphic processor.

Also disclosed is a method of a neuromorphic-processing system having a special-purpose host processor and a neuromorphic co-processor including, in some embodiments, enhancing special-purpose processing of the host processor with an artificial neural network of the co-processor. The host processor is operable as a stand-alone host processor.

In some embodiments, the method further includes transmitting frequency elements or signal spectrum information from the host processor configured as a hearing-aid processor to the co-processor in the form of Fourier transforms over a serial communications interface; and demultiplexing serial signals from the serial communications interface with a demultiplexer of the co-processor into parallel signals for a plurality of inputs of the artificial neural network.

In some embodiments, enhancing the special-purpose processing of the hearing-aid processor includes providing information to the hearing-aid processor over the serial communications interface, thereby enabling the hearing-aid processor to selectively suppress noise and enhance desired signals.

In some embodiments, enhancing the special-purpose processing of the hearing-aid processor includes providing a frequency mask to the hearing-aid processor over the serial communications interface, thereby indicating noise frequencies to suppress and signal frequencies to boost.

In some embodiments, the method further includes updating synaptic weights of the artificial neural network. The synaptic weights of the artificial neural network are stored in firmware of the neuromorphic co-processor configured for cloud-based updates.

DRAWINGS

Embodiments of this disclosure are illustrated by way of example and not by way of limitation in the figures of the accompanying drawings, in which like references indicate similar elements and in which.

DESCRIPTION

Terminology

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files and may contain related or unrelated contents or no contents at all. A file may also have a logical format or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "host processor" includes a primary processor such as a CPU or digital signal processor (DSP) of an IC in a system. The host processor is one that can stand alone but benefits from addition of neuromorphic computing provided by a neuromorphic IC or processor thereof through the microcontroller interface.

The term "co-processor" includes an additional processor interfaced with the host processor through a microcontroller interface. The additional processor can be configured to perform functions not possible with the host processor alone or functions the co-processor can perform faster or at lower power.

The term "enhancement filter" includes a filter configured to suppress undesired noise in a signal by selectively attenuating or boosting certain components of the signal on a time-varying basis. Likewise, "enhancement filtering" includes filtering to suppress undesired noise in a signal by selectively attenuating or boosting certain components of the signal on a time-varying basis.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
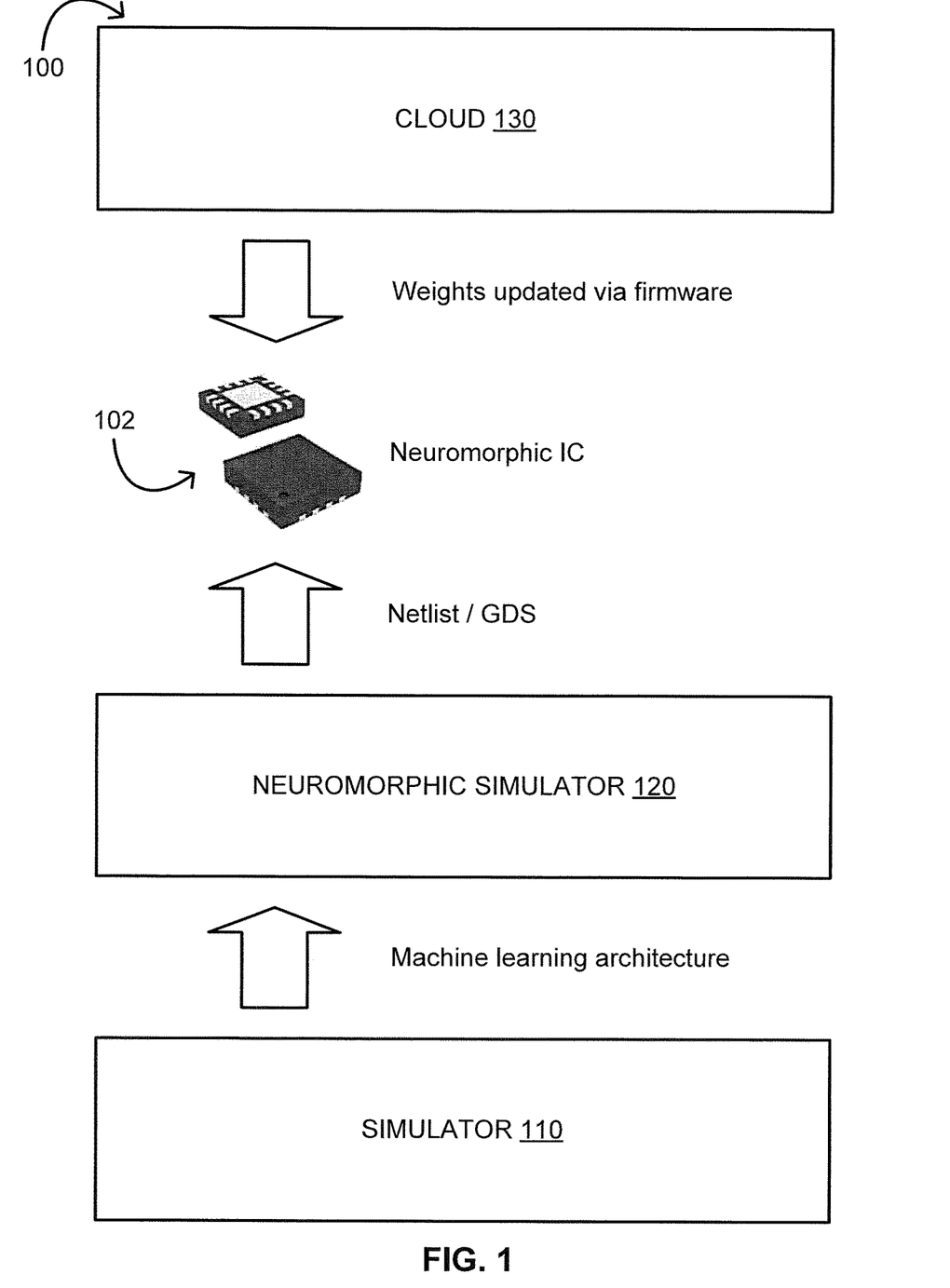
FIG. 1 provides a schematic illustrating a system 100 for designing and updating neuromorphic integrated circuits ("ICs") in accordance with some embodiments.

Referring now to FIG. 1, a schematic illustrating a system 100 for designing and updating neuromorphic ICs is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the nodes, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSPs") including, but not limited to, keyword spotting, voice recognition, one or more audio filters, speech enhancement, gesture recognition, image recognition, video object classification and segmentation, or autonomous vehicles including drones. For example, if the particular problem is one of speech enhancement, the simulator 110 can create a machine learning architecture with respect to one or more aspects of speech enhancement. The neuromorphic synthesizer 120 can subsequently transform the machine learning architecture into a netlist and a GDS file corresponding to a neuromorphic IC for speech enhancement, which can be fabricated in accordance with current IC fabrication technology. Once the neuromorphic IC for speech enhancement is fabricated, it can be deployed to work on speech enhancement in or with, for example, a hearing system or device as detailed further herein.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet-of-things ("IoT") devices, or hearing systems or devices.

Figure 2:
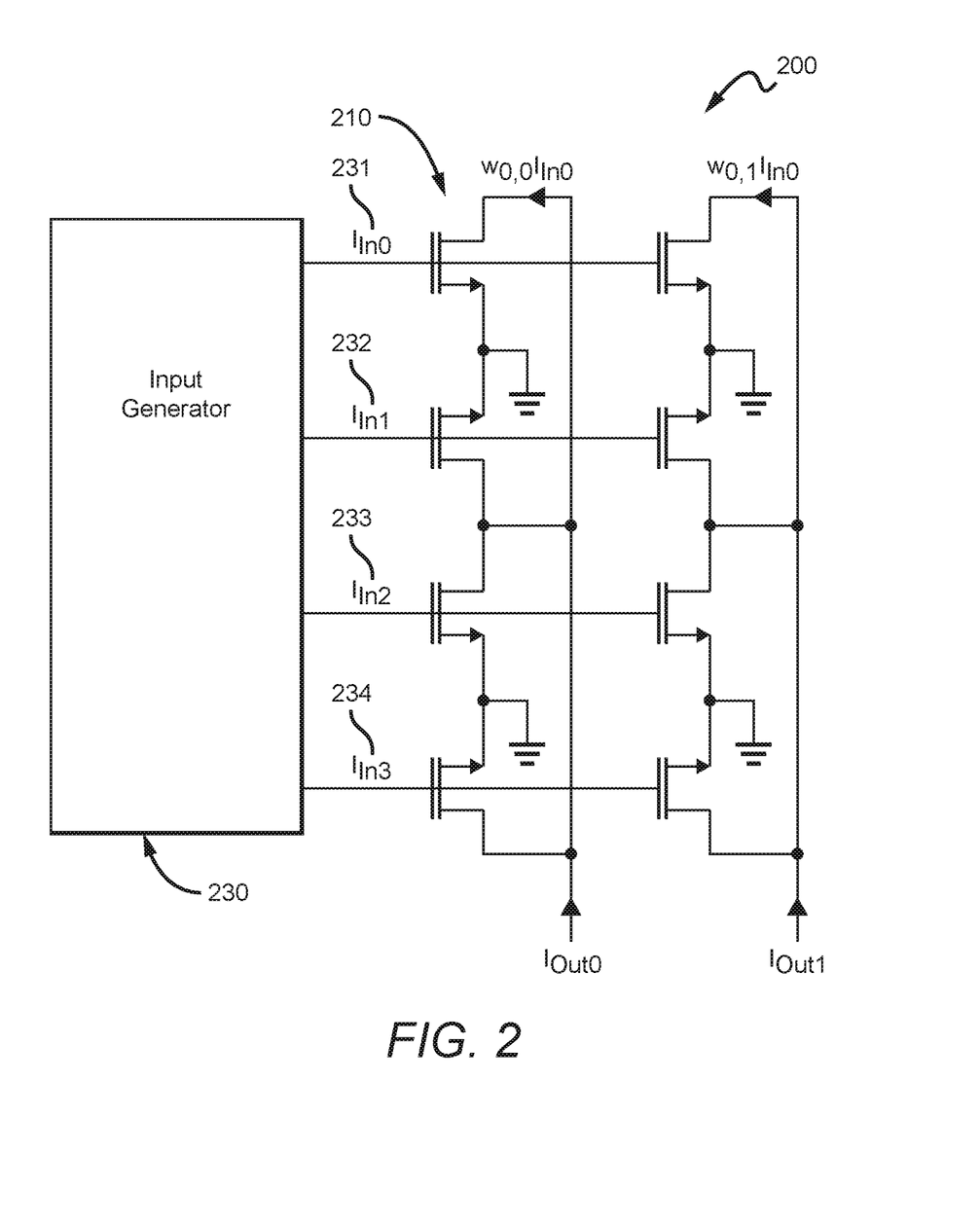
FIG. 2 provides a schematic illustrating an analog multiplier array in accordance with some embodiments.

Referring now to FIG. 2, a schematic illustrating an analog multiplier array 200 is provided in accordance with some embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC.

Since the analog multiplier array 200 is an analog circuit, input and output current values can vary in a continuous range instead of simply on or off. This is useful for storing weights (aka coefficients) of a neural network as opposed to digital bits. In operation, the weights are multiplied by input current values to provide output current values that are combined to arrive at a decision of the neural network.

The analog multiplier array 200 can utilize standard programming and erase circuitry to generate tunneling and erase voltages.

Figure 3:
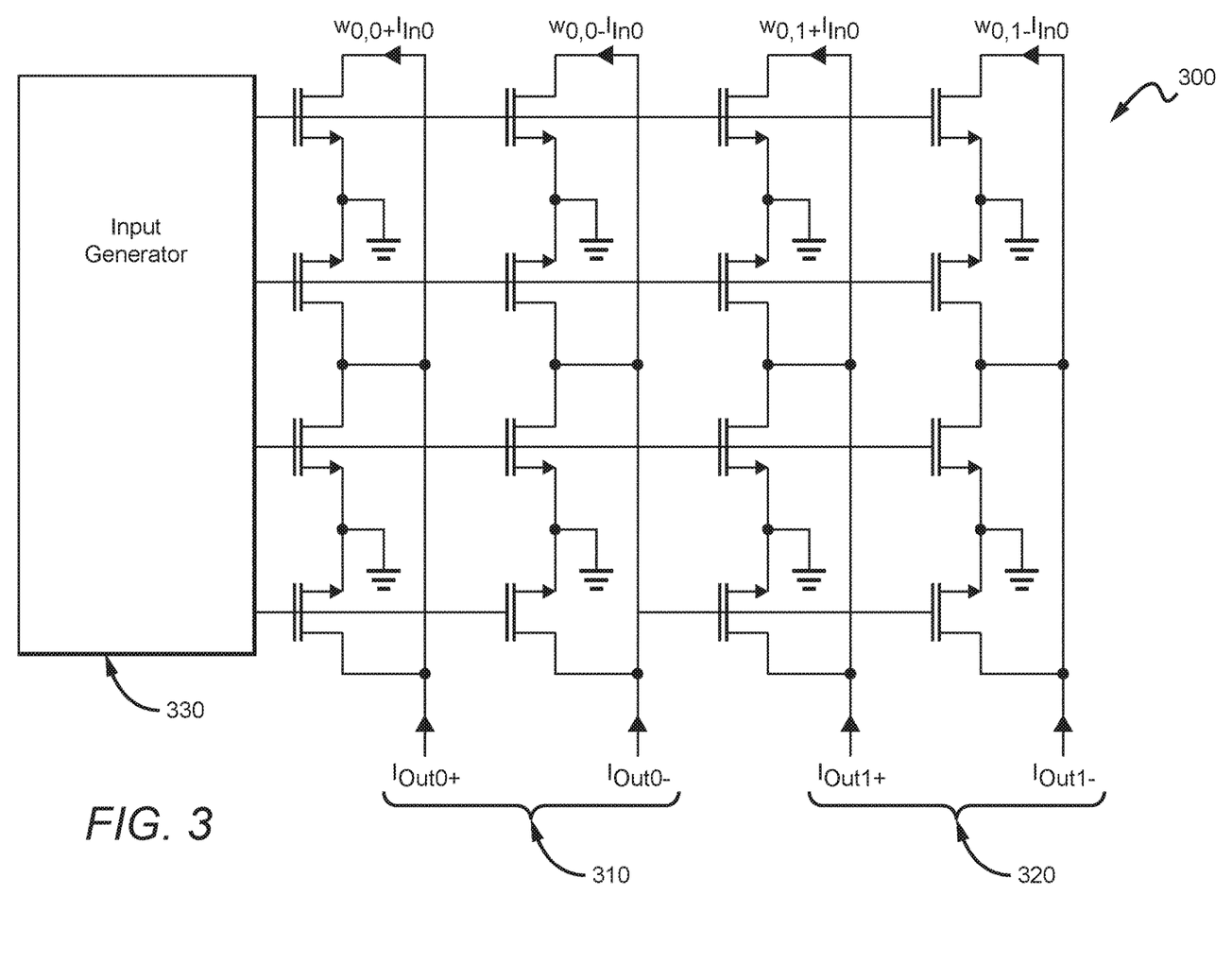
FIG. 3 provides a schematic illustrating an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive metal-oxide-semiconductor field-effect transistor ["MOSFET"] and a negative MOSFET) to perform a two-quadrant multiplication of a signed weight (e.g., a positive weight or a negative weight) and a non-negative input current value. If an input current value is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). The foregoing positively and negatively weighted products or output signal values can be taken as a differential current for arbitrary current-sensing circuitry (e.g., current mirrors, charge integrators, and transimpedance devices) to provide useful information for making a decision.

Figure 4:
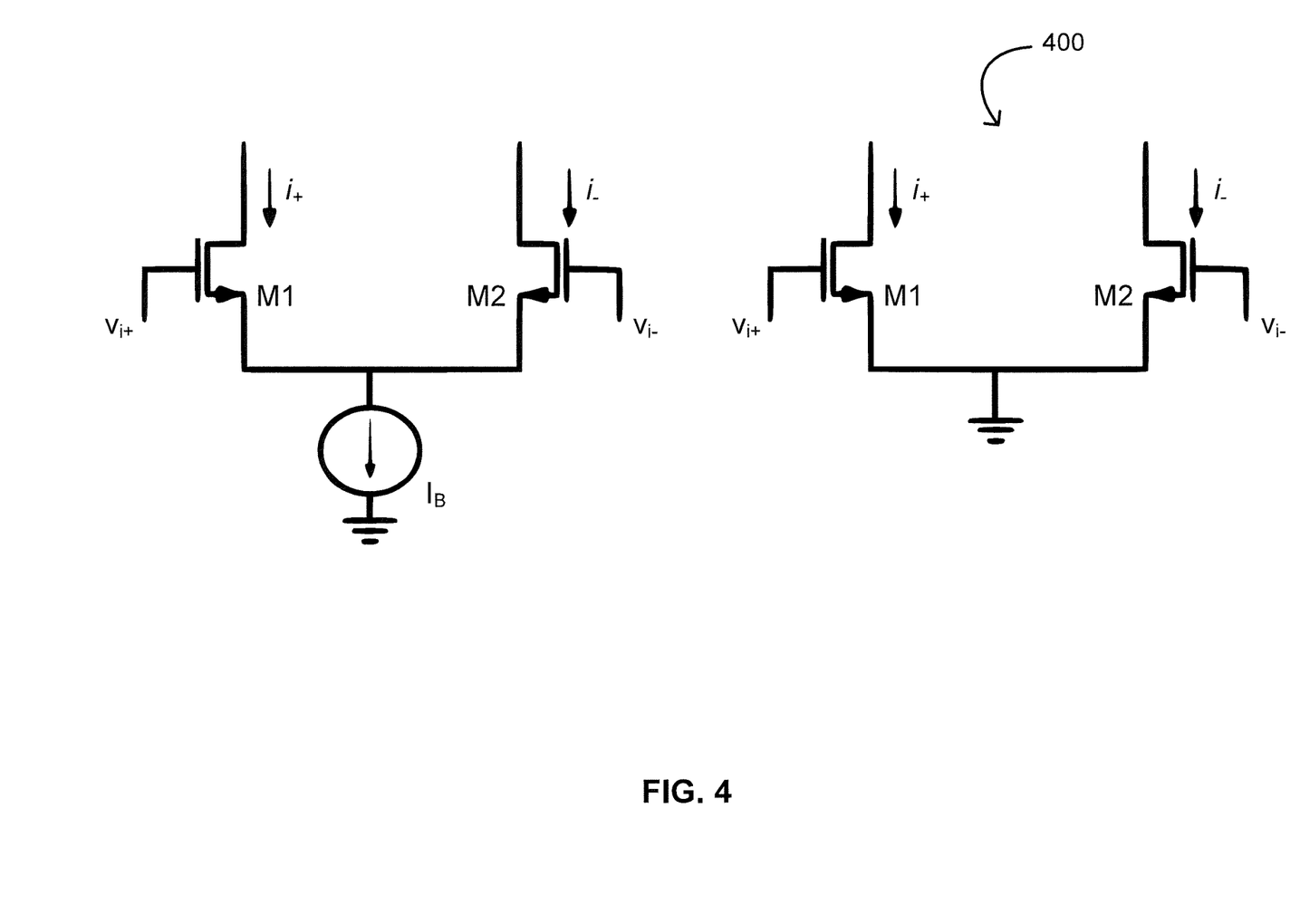
FIG. 4 provides a schematic illustrating a bias-free, two-quadrant multiplier of an analog multiplier array in accordance with some embodiments.

Referring now to FIG. 4, a schematic illustrating a bias-free two-quadrant multiplier 400 of an analog multiplier array such as the analog multiplier array 300 is provided in accordance with some embodiments. Because each output current from the positive (e.g., M1 of the two-quadrant multiplier 400) or negative transistor (e.g., M2 of the two-quadrant multiplier 400) is wired to ground and proportional to the product of the input current value and the positive or negative weight, respectively, the power consumption of the positive or negative transistor is at or near zero when the input current values or weights are at or near zero. That is, if the input signal values are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on, particularly when sparsity (many zeros) is encouraged in the neural networks of such multipliers during the training. This is unlike differential pair-based multipliers, which consume a constant current (e.g., by means of a tail bias current $I_B$) regardless of the input signal. That is, even when current input values or weight values are about zero in such multipliers, total current is still at $I_B$.

Figure 5:
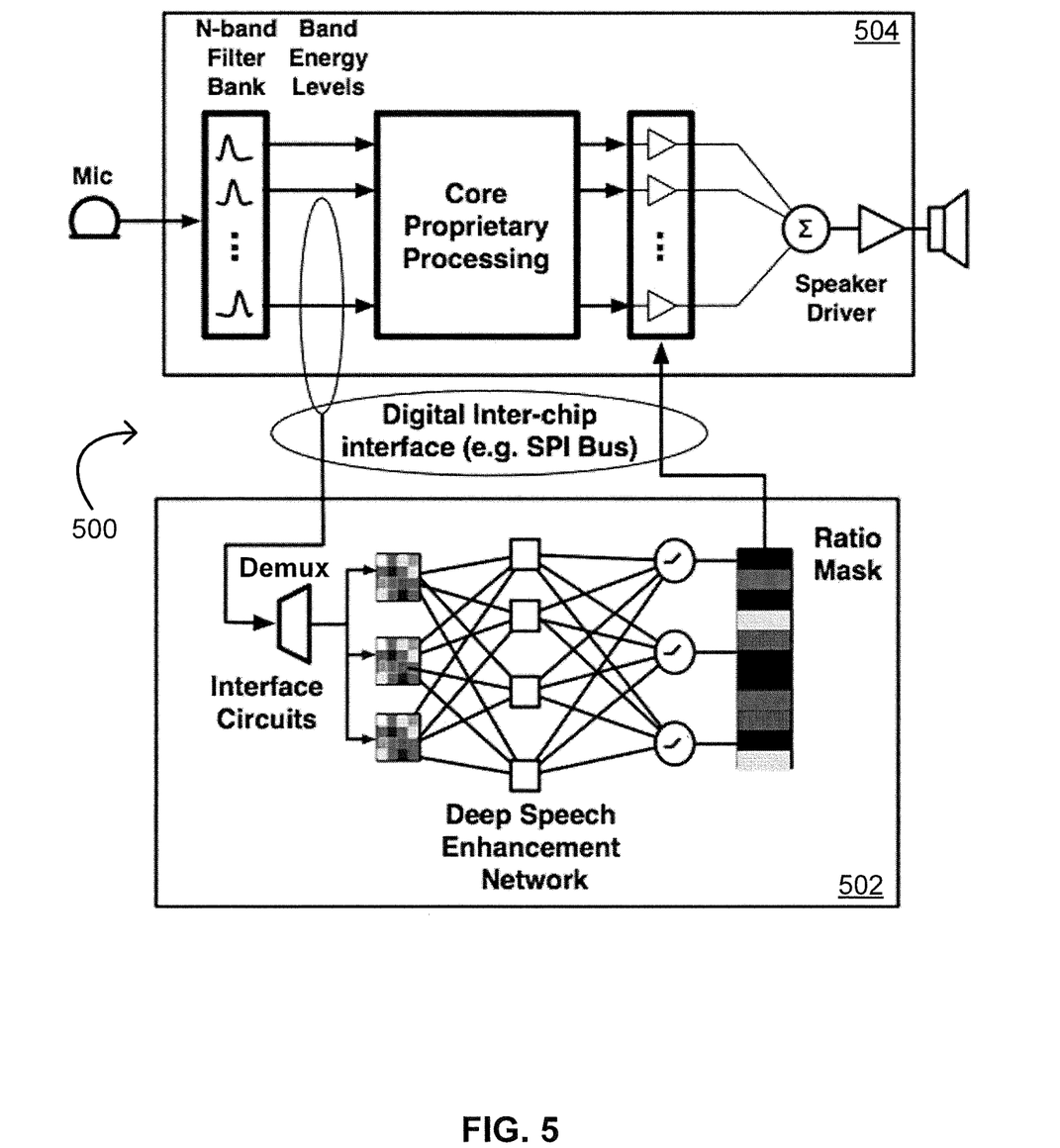
FIG. 5 provides a schematic illustrating a microcontroller interface between a co-processor of a neuromorphic IC and a host processor of a special-purpose IC in accordance with some embodiments.

Referring now to FIG. 5, a schematic is provided illustrating a microcontroller interface 500 between a co-processor of a neuromorphic IC 502 and a host processor of a special-purpose IC 504 in accordance with some embodiments. While the neuromorphic IC 502 and the special-purpose IC 504 are shown as two distinct ICs in FIG. 5, such as two distinct ICs of a multi-chip module or stacked die assembly, it should be understood the foregoing ICs can alternatively be embodied in a single monolithic IC. As such, description regarding the microcontroller interface 500 between the co-processor of the neuromorphic IC 502 and the host processor of the special-purpose IC 504 should also be taken to describe the microcontroller interface 500 between a neuromorphic co-processor and special-purpose host processor of a single monolithic IC; that is, unless context clearly indicates otherwise.

As shown in FIG. 5, the special-purpose IC 504 can include, but is not limited to, an IC for hearing systems or devices including hearing aids. An IC for a hearing aid can include a hearing-aid host processor (see "Core Proprietary Processing" in FIG. 5) as the special-purpose host processor, as well as a microphone, a filter bank, a speaker driver, and a speaker. However, it should be understood the neuromorphic co-processor can be interfaced with any one or more of a number of special-purpose host processors. The example embodiment of the neuromorphic co-processor interfaced with the hearing-aid host processor is merely provided for exposition. It should be understood that extension to other ASSPs might need certain modifications in line with the specific functions of the other ASSPs.

Adverting back to the particular problem of speech enhancement, there are efforts to solve the so-called cocktail party problem in hearing aids. The cocktail party problem occurs in settings such as a restaurant or party, where a hearing-impaired person with hearing aids is trying to hold a conversation with one person while there are many other people holding simultaneous conversations within earshot. It can be nearly impossible for the hearing-impaired person to pick out the conversation with the one person (desired signals) among all the many other people holding conversations (noise signals) within earshot when the hearing aids amplify all signals.

Deep learning networks can learn to look at speech in noisy environments such as that of the cocktail party problem and identify a pattern of frequency masks that can suppress the noise signals and pass through the desired signals. In step with the description for FIG. 1, the simulator 110 can create a machine learning architecture with respect to one or more aspects of speech enhancement including the conversation with the one person. The neuromorphic synthesizer 120 can subsequently transform the machine learning architecture into a netlist and a GDS file corresponding to a neuromorphic IC for speech enhancement, which can be fabricated in accordance with current IC fabrication technology—optionally as the above-referenced single monolithic IC—and deployed such that the neuromorphic co-processor can work as an audio co-processor on speech enhancement in or with, for example, a hearing system or device.

As shown in FIG. 5, the neuromorphic IC 502 or a portion of the above-referenced single monolithic IC corresponding to the neuromorphic IC 502 can include, but is not limited to, i) one or more interface circuits including a demultiplexer configured to demultiplex serial signals into parallel signals and ii) a deep-speech enhancement network with cloud-updateable synaptic weights configured to generate from the parallel signals ratio masks that separate desired speech signals from noise signals with reasonable sound quality. Again, the hearing-aid IC 504 or a portion of the above-referenced single monolithic IC corresponding to the hearing-aid IC 504 can include, but is not limited to, the hearing-aid host processor, the microphone, the filter bank, the speaker driver, and the speaker. The neuromorphic IC 502 and the hearing-aid IC 504 can be configured to communicate over a digital inter-chip interface such as a serial communications interface includes a SPI bus or FC bus.

The hearing-aid host processor can be configured to transmit frequency elements or signal spectrum information in the form of Fourier transforms or similar frequency decompositions over the SPI bus to the neuromorphic co-processor for audio signal-processing tasks such as audio enhancement or de-noising. The neuromorphic co-processor can be configured to subsequently perform the audio-signal processing tasks and transmit results back over the SPI bus to the hearing-aid host processor, the results including optimum weighting coefficients for frequencies in the form of a frequency or ratio mask. The hearing-aid host processor can be configured to subsequently aggregate the signals and deliver the aggregated signals to the hearing-impaired person with the hearing aid in accordance with the frequency mask. For example, the frequency mask could indicate the hearing aid should suppress frequencies in the 200-230 Hz range (mostly noise signals) and boost frequencies between 300-360 Hz (mostly desired signals).

With respect to generating the frequency or ratio mask, the neuromorphic co-processor can be configured to break up the frequency elements or signal spectrum information transmitted by the hearing-aid host processor into different frequency components at every time step. At every time step, the deep-speech-enhancement network can be configured to determine whether to attenuate or amplify certain frequency components based upon the extent to which they are mostly noise signals or mostly desired signals. The frequency mask then is the set of attenuation or amplification factors at each given time step that indicates the set of frequencies that should suppressed or boosted.

Methods

A method of an integrated circuit having a special-purpose host processor and a neuromorphic co-processor includes, in some embodiments, enhancing special-purpose processing of the otherwise stand-alone host processor with an artificial neural network of the co-processor. As set forth herein, the host processor can be a hearing-aid processor. Enhancing the special-purpose processing of the hearing-aid processor includes providing information to the hearing-aid processor over the serial communications interface, thereby enabling the hearing-aid processor to selectively suppress noise and enhance desired signals. Alternatively, or additionally, enhancing the special-purpose processing of the hearing-aid processor includes providing a frequency mask to the hearing-aid processor over the serial communications interface, thereby indicating noise frequencies to suppress and signal frequencies to boost.

The method of the integrated circuit can further include transmitting frequency elements or signal spectrum information from the host processor (e.g., the hearing-aid processor) to the co-processor in the form of Fourier transforms over the serial communications interface. In a next operation, the method can further include demultiplexing serial signals from the serial communications interface with the demultiplexer of the co-processor into parallel signals for the plurality of inputs of the artificial neural network.

The method can further include updating the synaptic weights of the artificial neural network. The synaptic weights of the artificial neural network can be stored in the firmware of the integrated circuit configured for cloud-based updates.

Figure 6:
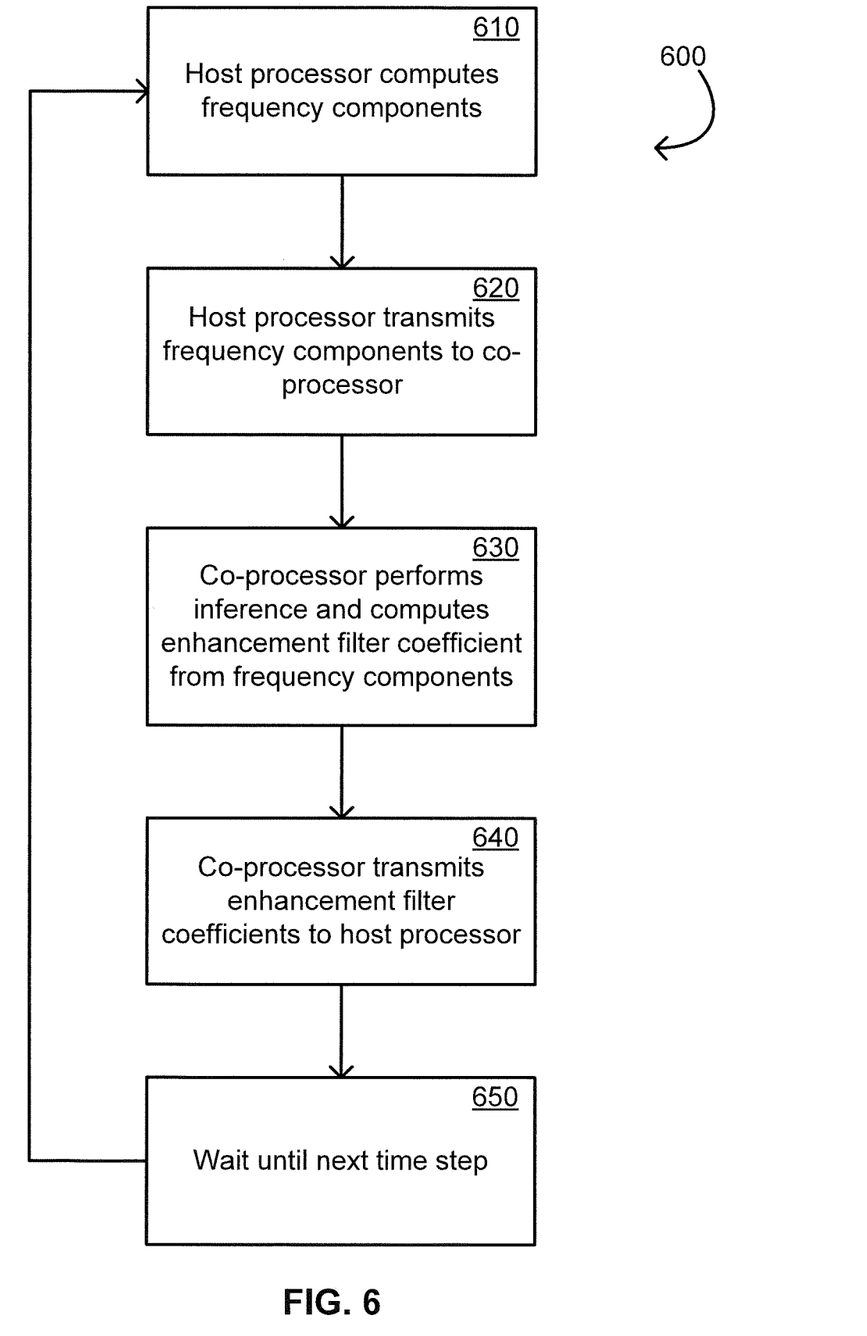
FIG. 6 provides a schematic illustrating a method of a neuromorphic IC for enhancing a signal-to-noise ratio in accordance with some embodiments.

Referring now to FIG. 6, a schematic is provided illustrating a method 600 of a neuromorphic IC for enhancing a signal-to-noise ratio in accordance with some embodiments. As shown, the method includes 1) a first step 610 where the hearing-aid host processor computes frequency components; 2) a second step 620 where the hearing-aid host processor transmits the frequency components to the neuromorphic co-processor; 3) a step 630 where the neuromorphic co-processor performs inference and computes enhancement filter coefficients from the frequency components; 4) a step 640 where the neuromorphic co-processor transmits the enhancement filter coefficients to the hearing-aid host processor; and 5) a step 650 where the neuromorphic co-processor waits until the next time step.

In view of the foregoing, the power of deep learning networks can be used to enhance at least speech in noisy environments such as that of the cocktail party problem and identify a pattern of frequency masks that can suppress the noise signals and pass through the desired signals. Thereby, the neuromorphic co-processors provided herein can enhance special-purpose host processors using algorithms the host processors cannot do alone, all while the special-purpose host processors perform the functions (e.g., noise cancellation, impulse noise detection, control functions [e.g., volume, battery power tracking, etc.], and the like for hearing-aid host processors) they are designed to do.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A neuromorphic-processing system comprising, comprising:
a special-purpose host processor operable as a stand-alone host processor;
a neuromorphic co-processor including an artificial neural network; and
a communications interface between the host processor and the co-processor configured to transmit information therebetween,
wherein the co-processor is configured to enhance special-purpose processing of the host processor with the artificial neural network;
wherein the host processor is a hearing-aid processor configured to transmit frequency elements or signal spectrum information to the co-processor in the form of Fourier transforms over a serial communications interface as the communications interface, and
wherein the co-processor further includes a demultiplexer configured to demultiplex serial signals from the serial communications interface into parallel signals for a plurality of inputs of the artificial neural network.

2. The neuromorphic-processing system of claim 1, wherein the communications interface between the host processor and the co-processor is a serial peripheral interface "SPI") bus or inter-integrated circuit ("I2C") bus.

3. The neuromorphic-processing system of claim 1, wherein the co-processor is configured to enhance the special-purpose processing of the hearing-aid processor by providing information to the hearing-aid processor over the communications interface, thereby enabling the hearing-aid processor to selectively suppress noise and enhance desired signals.

4. The neuromorphic-processing system of claim 1, wherein the co-processor is configured to enhance the special-purpose processing of the hearing-aid processor by providing a frequency mask to the hearing-aid processor over the communications interface, thereby indicating noise frequencies to suppress and signal frequencies to boost.

5. The neuromorphic-processing system of claim 4, wherein the frequency mask is a set of attenuation or amplification factors corresponding to a set of frequencies to be suppressed or boosted for each of a number of time steps in an audio sample.

6. The neuromorphic-processing system of claim 1, wherein the artificial neural network is disposed in an analog multiplier array of a plurality of two-quadrant multipliers in a memory sector of the neuromorphic-processing system.

7. The neuromorphic-processing system of claim 1, wherein synaptic weights of the artificial neural network are stored in firmware of the neuromorphic co-processor, and
wherein the firmware is configured for cloud-based updates to update the synaptic weights of the artificial neural network.

8. The neuromorphic-processing system of claim 1, wherein the host processor and the co-processor are embodied in a single monolithic integrated circuit, a stacked die assembly, a multi-chip module, or separate integrated circuits of separate modules, and
wherein neuromorphic-processing system is configured to operate on battery power.

9. A neuromorphic processor, comprising:
one or more interface circuits comprising a demultiplexer configured to demultiplex serial signals into parallel signals;
wherein the serial signals are received from a serial communications interface between the neuromorphic processor and a special-purpose host processor; and a multi-layered artificial neural network configured to receive the parallel signals from the interface circuits, wherein the neuromorphic processor is configured to enhance special-purpose processing of the host processor with the artificial neural network;

wherein the host processor is a hearing-aid processor, and wherein the neuromorphic processor is configured to receive frequency elements or signal spectrum information from the hearing-aid processor in the form of Fourier transforms over the serial communications interface.

10. The neuromorphic processor of claim 9, wherein the neuromorphic processor is configured to enhance the special-purpose processing of the hearing-aid processor by providing information to the hearing-aid processor over the serial communications interface, thereby enabling the hearing-aid processor to selectively suppress noise and enhance desired signals.

11. The neuromorphic processor of claim 9, wherein the neuromorphic processor is configured to enhance the special-purpose processing of the hearing-aid processor by providing a frequency mask to the hearing-aid processor over the serial communications interface, thereby indicating noise frequencies to suppress and signal frequencies to boost.

12. The neuromorphic processor of claim 11, wherein the frequency mask is a set of attenuation or amplification factors corresponding to a set of frequencies to be suppressed or boosted for each of a number of time steps of an audio sample.

13. The neuromorphic processor of claim 9, wherein the artificial neural network is disposed in an analog multiplier array of a plurality of two-quadrant multipliers in a memory sector of the neuromorphic processor.

14. A method of a neuromorphic-processing system having a special-purpose host processor and a neuromorphic co-processor, comprising:

enhancing special-purpose processing of the host processor with an artificial neural network of the co-processor, wherein the host processor is operable as a stand-alone host processor; and transmitting frequency elements or signal spectrum information from the host processor configured as a hearing-aid processor to the co-processor in the form of Fourier transforms over a serial communications interface; and demultiplexing serial signals from the serial communications interface with a demultiplexer of the co processor into parallel signals for a plurality of inputs of the artificial neural network.

15. The method of claim 14, wherein enhancing the special-purpose processing of the hearing-aid processor includes providing information to the hearing-aid processor over the serial communications interface, thereby enabling the hearing-aid processor to selectively suppress noise and enhance desired signals.

16. The method of claim 14, wherein enhancing the special-purpose processing of the hearing-aid processor includes providing a frequency mask to the hearing-aid processor over the serial communications interface, thereby indicating noise frequencies to suppress and signal frequencies to boost.

17. The method of claim 14, further comprising:

updating synaptic weights of the artificial neural network, wherein the synaptic weights of the artificial neural network are stored in firmware of the neuromorphic co-processor configured for cloud-based updates.

* * * * *